United States Patent

Tagami et al.

[11] Patent Number: 5,181,063
[45] Date of Patent: Jan. 19, 1993

[54] CAMERA SHUTTER

[75] Inventors: Shigeru Tagami; Kazuo Akimoto; Kanji Ito; Katsuhiko Matsushita, all of Chiba, Japan

[73] Assignee: Seikosha Co., Ltd., Tokyo, Japan

[21] Appl. No.: 719,875

[22] Filed: Jun. 24, 1991

[30] Foreign Application Priority Data

Jun. 25, 1990 [JP] Japan ................................. 2-67124

[51] Int. Cl.⁵ .............................................. G03B 7/08
[52] U.S. Cl. .................................. 354/435; 354/437; 354/439
[58] Field of Search ............... 354/435, 436, 437, 439, 354/460

[56] References Cited

U.S. PATENT DOCUMENTS 3,971,047  7/1976  Isobe et al. ....................... 354/460
4,963,916  10/1990 Tanaka et al. ..................... 354/435
4,989,030  1/1991  Naka et al. ........................ 354/435

Primary Examiner—Richard A. Wintercorn
Assistant Examiner—Jae N. Noh
Attorney, Agent, or Firm—Jordan and Hamburg

[57] ABSTRACT

A camera shutter system has a motor driven sector for opening and closing a shutter opening. A photo-interruptor is positioned to intercept a light beam, to effect the generation of a photo-interruptor signal. A timer has a counter that is set to a first count in response to the photo-interruptor signal, and is reset when a given count is reached. A shutter malfunction signal is generated when the level of the photo-interruptor signal has not changed by the time the given count is reached.

3 Claims, 4 Drawing Sheets

CAMERA SHUTTER

FIELD OF THE INVENTION

This invention relates to a camera shutter especially adapted to detect a malfunction of a sector for opening and closing a shutter opening.

This invention is related to co-pending application U.S. Ser. No. 07/717,444, filed Jun. 19, 1991, and U.S. Ser. No. 719,880, U.S. Ser. No. 07/719,866, filed concurrently herewith. The contents of these three applications are incorporated herein by reference.

BACKGROUND OF THE INVENTION

A sector forming a part of a camera shutter is generally a mechanical element which is actuated by rotating a motor to define an exposure quantity and an aperture diameter. As a consequence, if the rotation of the motor fluctuates due to a change in battery power, the exposure quantity and aperture diameter cannot be defined properly, and synchronized operation of a strobe light cannot be attained, thereby resulting in inferior photography.

According to Japanese Laid-Open Patent Document No. 61-163027 "Speed Control Device of Camera Shutter Driving Motor", the shutter closing time relating to an exposure quantity $E_V$ is stored in a memory circuit in the form of data for the control of motor speed or data for the control of the width of driving pulses to be sent to a motor. As soon as the operating speed of a sector is detected, the width of the driving pulses is determined as a function of the data stored in the memory circuit. In order to detect the operating speed of the sector, an opening is formed in the sector such that a light beam traveling between light emitting and light receiving elements of a photo-interruptor signal output means is intercepted by the leading edge o passed through the opening of the sector. In Japanese Laid-Open Patent Document No. 61-163027 "Speed Control Device of Camera Shutter Driving Motor", as well as in Japanese Laid-Open Patent Document No. 62-194239, however, which disclose a photo-interruptor means actuated by a sector, although the shutter will be reliably actuated, its malfunction cannot be detected.

SUMMARY OF THE INVENTION

It is an object of the invention to provide a camera shutter which can detect a malfunction of a shutter for opening and closing a lens opening by providing a detecting section in the sector, calculating a desired exposure quantity on the basis of the transition of the waveform of an interruptor signal generated in response to an emitted beam, and monitoring the progress of transition of the interruptor signal with a timer.

In order to achieve the above object, a camera shutter according to the present invention comprises a motor, a sector for opening and closing a shutter opening in response to the rotation of the motor, and photo-interruptor signal output means adapted to be actuated by a light beam traveling from a light emitting element to a light receiving element via a detecting section in the sector, to output a photo-interruptor signal. A timer is set by the photo-interuptor signal and reset when a given time count is reached. A shutter malfunction detecting means is provided for closing the sector and delivering a malfunction signal when the level of the photo-interruptor signal does not change before the timer finishes counting of the given time count.

BRIEF DESCRIPTION OF THE DRAWINGS

An embodiment of a camera shutter according to the present invention will now be described in greater detail with reference to the accompanying drawings.

DESCRIPTION OF THE PREFERRED EMBODIMENTS

Figure 1:
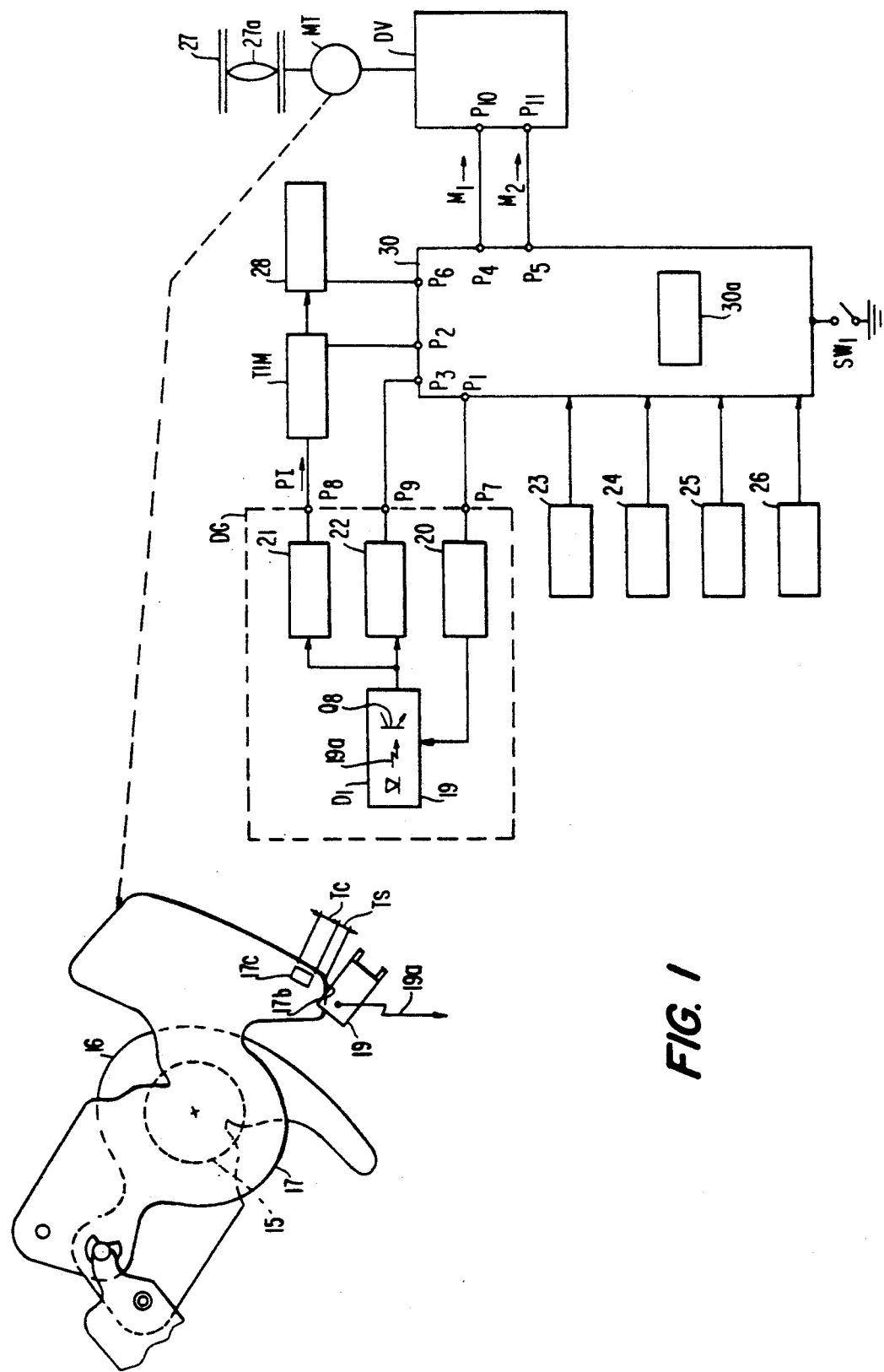
FIG. 1 is a block diagram of a camera shutter according to the present invention.

As shown in FIG. 1, a camera shutter comprises a motor MT for moving sectors 16 and 17; a PI signal generating circuit DG including a photo coupler 19 comprised of a light emitting diode $D_1$ and a light receiving transistor $Q_8$, a starter circuit 20, a PI signal sending circuit 21, and a data access circuit 22. The shutter further includes a shutter malfunction detecting circuit 28, a timer TIM, and a motor driving circuit DV including transistors $Q_1$ through $Q_6$ for driving a motor coil MC. A CPU 30 includes a ROM 30a. The CPU 30 stores an "illegal" processing program which is actuated in response to a malfunction signal given from the shutter malfunction detecting circuit 28, and a motor control program.

Figure 2:
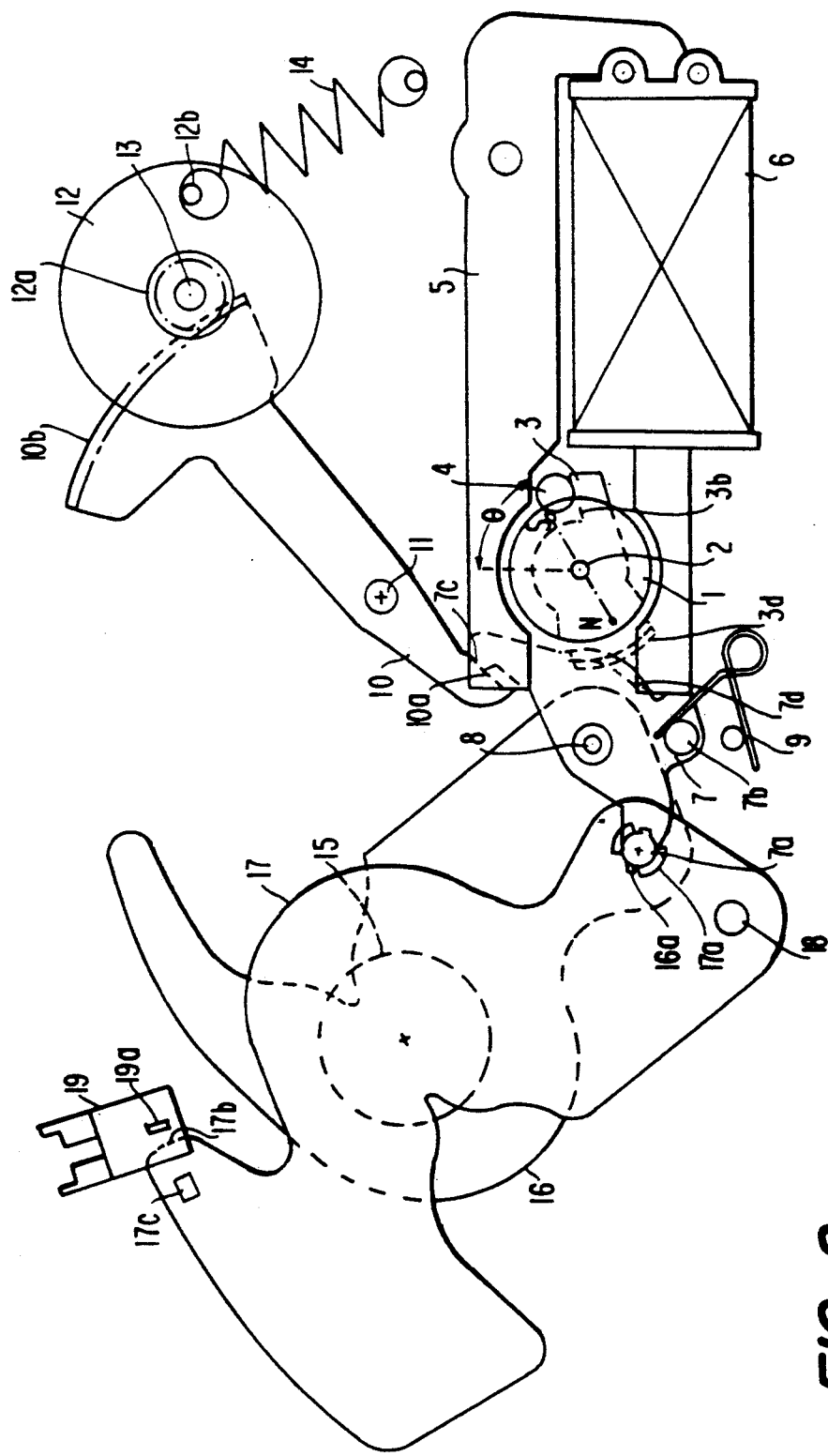
FIG. 2 is a structural diagram showing sectors and a rotor as shown in FIG. 1.

As shown in FIG. 2, the rotor 1 of a motor MT is comprised of a permanent magnet radially magnetized to exhibit two poles. A rotor shaft 2 is press-fit to the rotor at the center of the magnet. A rotor pinion 3 has a gear portion 3a in engagement with a gear portion 7d of an open/close lever 7, and an arm portion 3b acting as stopper. This arm portion 3b is designed so that when a motor coil 6 on a stator 5 is not energized, the rotor 1 stops at an angular displacement $\theta$ of about 58 degrees with respect to a stationary position. This angle is determined by the press-fit angle of the arm portion 3b of the rotor pinion 3 with respect to the magnetization angle of the rotor 1.

The stator 5 and motor coil 6 are positioned outside the rotor 1. The motor coil 6 can be energized in both, forward and backward directions, that is, the sectors 16 and 17 open in response to forward energization of the coil and close in response to backward energization of the coil. Specifically, when the motor coil 6 is forwardly energized at one electric polarity, the magnetic pole of the stator 5 and the opposing magnetic pole of the rotor 1 assume the same magnetic polarity, so that the rotor is repulsed and rotated. Backward energization of the coil produces the opposite result.

The open/close lever 7 has a pin 7a for driving the sectors 16 and 17. A protrusion 7b of the lever 7 serves as the point of action of a spring 9. A projection portion 7c is provided for pushing an intermediate lever 10. The gear portion 7d of the lever 7 engages the rotor pinion 3.

The spring 9 urges the open/close lever 7 in the shutter closing direction, so that even when the motor coil 6 is not energized, the sectors 16 and 17 are urged by the spring 9 from the open position toward the closed position.

The intermediate lever 10 has an arm portion 10a acting on the open/close lever 7 and a gear portion 10b engaging a gear portion 12a of a flywheel 12. This flywheel 2 has a gear portion 12a and a protrusion 12b on which a flywheel spring 14 acts. The flywheel spring 14 urges the flywheel 12 and the intermediate lever 10 in the shutter closing direction. In the initial state of the shutter, the intermediate lever 10 abuts the projection portion 7c of the open/close lever 7.

The sector 16 is pivoted at the rotational center 8 of the open/close lever 7, and the pin 7a is rotatably fitted in a slot 16a.

The sector 17 is pivoted to a front casing 18, and the pin 7a fitted in the sector 16 is rotatably fitted in a slot 17a in the same manner as the sector 16.

The sector 17 has an edge 17b and a rectangular hole 17c serving as a detecting section, these elements functioning to selectively intercept and pass a light beam 19a of the photo coupler 19.

The photo coupler 19 is designed so that a peripheral portion of the sector 7 is inserted between its light emitting and light receiving sections, and a photo-interruptor signal (referred to as the PI signal) output from the photo coupler 19 assumes an H level in the initial state when the beam is not intercepted by the sector 17 and an L level when the sector 17 is driven to intercept the beam 19a. The signal again assumes an H level when the beam passes through the rectangular hole 17c and an L level when the edge of the rectangular hole 17c intercepts the beam.

Figure 3:
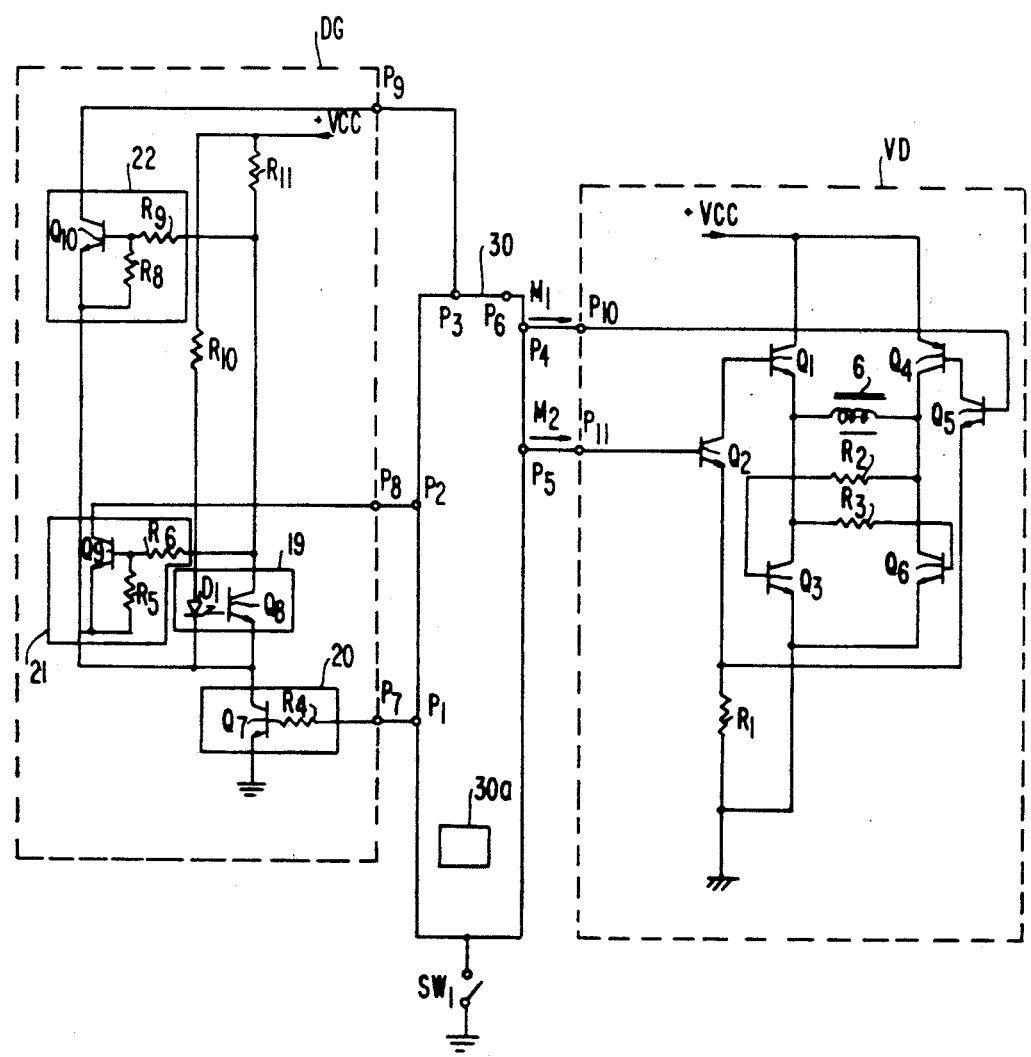
FIG. 3 is a circuit diagram showing a portion of FIG. 1.

As shown in FIG. 3, the PI signal generating circuit DG and the motor driving circuit DV of FIG. 1 are designed so that the pins $P_1$, $P_2$, $P_3$ and $P_4$, $P_5$ of the CPU 30 are connected to the pins $P_7$, $P_8$, $P_9$ of the PI signal generating circuit DG and the pins $P_{10}$, $P_{11}$ of the motor driving circuit DV, respectively.

The starter circuit 20 of the PI signal generating circuit DG is comprised of a transistor $Q_7$ and a resistor $R_4$. The base of the transistor $Q_7$ is connected via the resistor $R_4$ to the pin $P_7$ and its emitter is connected to a reference potential point. When driven by the CPU 30, the transistor $Q_7$ turns on to couple the reference potential point to the photo coupler 19, PI signal sending circuit 21, and data access circuit 22 via the collector of transistor $Q_7$.

The cathode of the light emitting diode $D_1$ and the emitter of the light receiving transistor $Q_8$ in the photo coupler 19 are connected to the collector of the transistor $Q_7$, and the anode of the light emitting diode $D_1$ and the collector of the light receiving transistor $Q_8$ are connected to a power source $+V_{cc}$ via resistors $R_{10}$ and $R_{11}$, respectively.

The base of a transistor $Q_9$ of the PI signal sending circuit 21 is connected via a resistor $R_6$ to the collector of the light receiving transistor $Q_6$. Its emitter is connected to the collector of the transistor $Q_7$, and its collector is connected to the pin $P_8$, so that the PI signal is applied from the collector to the pin $P_8$. The initial PI signal that is output is called a first photo-interruptor signal, and the PI signal subsequently sent out is called a second photo-interruptor signal. In the following description, the first photo-interruptor signal defines a starting speed coefficient TS (or pulse TS), and the second photo-interruptor signal defines a shutter starting pulse TC.

The base of a transistor $Q_{10}$ of the data access circuit 22 is connected via a resistor $R_9$ to the collector of the light receiving transistor $Q_8$, and its collector is connected to the pin $P_9$.

When the starting speed coefficient (pulse) TS corresponding to the distance TS from the edge to the leading margin of the hole 17c of the sector 17 shown in FIG. 1 is output from the pin $P_8$ of the PI signal generating circuit DG, the timer TIM is controlled to begin its counting operation. Then, if the starting speed coefficient TS is output and the pin $P_8$ assumes the L level during the counting operation of the timer TIM, this means that the sector 17 is in the normal operating state. Thus, the open/close operation of the shutter is performed. If the pin $P_8$ does not assume the L level until the timer TIM completes its counting operation, the timer immediately actuates the shutter malfunction detecting circuit 28, thereby outputting the malfunction signal to the pin $P_6$ of the CPU 30.

The respective bases of the transistors $Q_2$ and $Q_5$ of the motor driving circuit DV are connected to the pins $P_{11}$ and $P_{10}$, respectively, and the $M_1$ and $M_2$ signals are normally at the L level. When the $M_1$ signal assumes an H level with the $M_2$ signal at the L level, the transistors $Q_5$, $Q_3$ and $Q_4$ turn on to energize the motor coil 6 in the direction of the solid-line arrow, so that the sectors 16 and 17 are opened. On the other hand, when the $M_2$ signal assumes an H level, the transistors $Q_2$, $Q_1$ and $Q_6$ turn on, so that the sectors 16 and 17 are closed.

In FIG. 1, block 23 is a film-sensitivity detecting section, block 24 is a photometer section, block 25 is a distance measuring section, block 26 is a mode selecting section, block 27 is a lens-barrel, block 27a is a lens, and $SW_1$ is a release button.

OPERATION OF THE INVENTION

Figure 4:
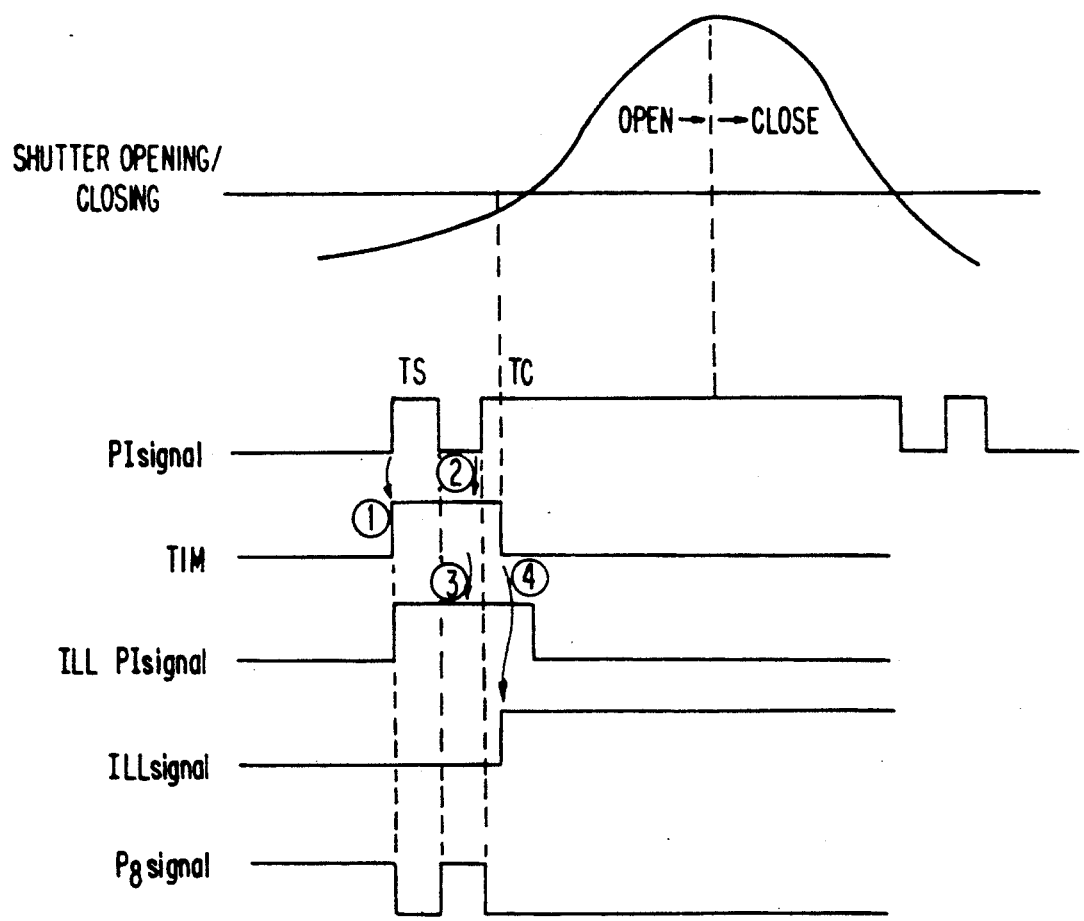
FIG. 4 is a timing diagram showing the operation of the shutter.

In the above described camera shutter, when the release button $SW_1$ is depressed, rotation of the motor causes the edge 17b of the sector 17 to be inserted between the light emitting diode $D_1$ and light receiving transistor $Q_8$ of the photo coupler 19 to intercept the light beam 19a. As a result, the PI signal is output from the pin $P_8$ of the PI signal sending circuit 21. The PI signal just sent out corresponds to the starting speed coefficient (pulse) TS and enables a prediction of the speed of the sector 17. When the speed of the sector 17 is relatively fast under the influence of voltage, temperature, etc., the time becomes relatively short, whereas when the speed is relatively slow, the time becomes relatively long. When the starting speed coefficient TS is output to the pin $P_8$, the pin $P_8$ assumes the L level and the timer TIM begins its counting operation at moment ① shown in FIG. 4. Then, if the pin $P_8$ assumes the H level at moment ② during the counting operation of the timer TIM, the normal operating state continues. On the other hand, if the pin $P_8$ is maintained at the H level or ILL PI signal till moment ④ at which time the timer TIM finishes its counting operation, an illegal signal ILL is immediately sent to the CPU 30. As a result, the CPU 30 actuates the illegal processing program, whereby the sectors 16 and 17 are held closed and a malfunction mark within a viewfinder (not shown) is it.

In the foregoing embodiment, the data processing operation between the CPU 30 and the PI signal generating circuit DG inclusive of the starter circuit 20 PI signal sending circuit 21 and data access circuit 22 may be changed to a serial mode of operation so that the pins $P_1$, $P_2$, $P_3$, $P_7$, $P_9$ and $P_8$ can be oombined.

The edge 17b and rectangular hole 17c provided to function as the detecting section may be formed such that the relationship between beam interception and beam passing is opposite to that of the above described embodiment of the invention.

Further, in place of the system of intercepting and passing the light beam 19a, the detecting section may be modified as to utilize a reflection pattern formed on the sector surface which selectively causes reflection and non-reflection or transmission of the beam.

The camera shutter according to the present invention comprises a motor, and a sector for opening and closing a shutter opening in response to the rotation of the motor. A photo-interruptor signal output means is actuated by a light beam traveling from a light emitting element to a light receiving element via an opening in the sector, to deliver a photo-interruptor signal. A timer is set by the photo-interruptor signal and reset when a given time count is reached. A shutter malfunction detecting means is provided for closing the sector and delivering a malfunction signal when the level of the photo-interruptor signal does not change before the timer finishes counting of the given time. It is therefore possible to detect the malfunction of the sector with the arrangement of the invention.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. A camera shutter comprising a motor, a sector for opening and closing a shutter opening in response to the rotation of the motor, said sector having a detecting section, whereby movement of said sector in response to rotation of said motor includes an initial movement prior to opening of said shutter opening, a photo-interruptor signal output means having a light emitting element and a light receiving element and actuated by a light beam traveling from said light emitting element to said light receiving element via said detecting section to output a phtoot-interruptor signal, a timer controlled to be set by the photo-interruptor signal, a timer controlled to be set by the photo-interruptor signal and reset when a given time count therein is reached, and a shutter malfunction detecting means for closing the sector during said initial movement and delivering a malfunction signal when the level of the photo-interruptor signal does not change before the timer finishes counting the given time count.

2. A camera shutter system comprising a motor, a sector responsive to rotation of said motor for opening and closing a shutter opening, whereby movement of said sector in response to rotation of said motor includes an intitial movement prior to said opening of said shutter opening, a photo-interruptor including a source of a light beam and a receiver positioned to receive said light beam, said sector having a detecting section positioned to interrupt said beam for controlling said photo-interruptor to output a photo-interruptor signal, a timer having a counter coupled to be set in response to said photo-interruptor signal to a first count and to be reset upon reaching a second given count, and a shutter malfunction detecting means for outputting a malfunction signal during said initial movement in response to the absence of a change in the photo-interruptor signal by the time said counter reaches said second count, whereby said malfunction detecting means indicates a malfunction in the movement of said sector.

3. A camera shutter according to claim 2, wherein said detecting section comprises a leading edge of said sector and a second edge spaced from said leading edge, whereby said photo-interruptor signal is a pulse having a width corresponding to the speed of said shutter, said given count corresponding to a count greater than a count corresponding to said speed.

* * * * *